W. A. FLEEK.
SHAFT COUPLING.
APPLICATION FILED FEB. 18, 1918.

1,274,254.

Patented July 30, 1918.

WITNESSES

INVENTOR
William A. Fleek
BY
ATTORNEYS

UNITED STATES PATENT OFFICE.

WILLIAM ALFRED FLEEK, OF DOUGLAS, TERRITORY OF ALASKA.

SHAFT-COUPLING.

1,274,254.

Specification of Letters Patent.

Patented July 30, 1918.

Application filed February 18, 1918. Serial No. 217,916.

*To all whom it may concern:*

Be it known that I, WILLIAM A. FLEEK, a citizen of the United States, and a resident of Douglas, Territory of Alaska, have invented a new and Improved Shaft-Coupling, of which the following is a full, clear, and exact description.

My invention relates to couplings for power shafts and is more particularly intended for use in connection with propeller shafts.

An object of the invention is to provide a flexible coupling permitting the propeller shaft to assume different angular positions relatively to the drive shaft while insuring an effective driving connection as well as an efficient thrust bearing for the propeller shaft at the coupling.

A further important object of the invention is to provide means associated with the coupling adjustable with facility to take up wear on the coupling.

Reference is to be had to the accompanying drawings it being understood that the drawings are merely illustrative of one example of the invention.

Figure 1:
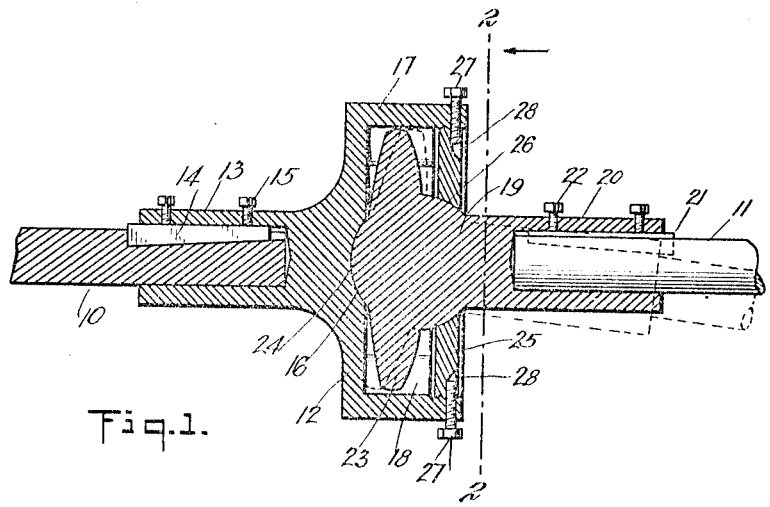
Figure 1 is a longitudinal section of a shaft coupling embodying my invention.
Figure 2:
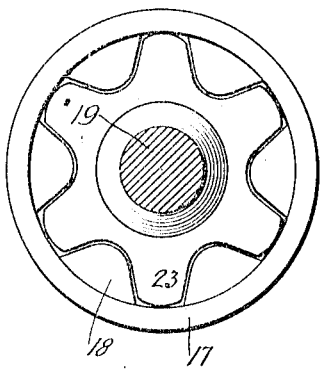
Fig. 2 is a transverse vertical section on the line 2—2, Fig. 1, parts being omitted.
Figure 3:
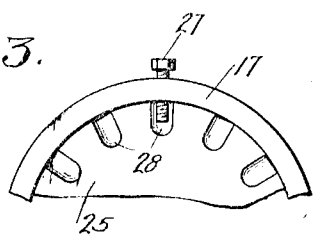
Fig. 3 is a fragmentary end view of one coupling element looking in the direction of the arrow in Fig. 1, the male coupling member being omitted.

In carrying out my invention in practice, to effect a coupling between an engine shaft or drive shaft 10 and a propeller shaft 11, a female coupling element 12 is provided adapted to be secured in any suitable manner to the drive shaft 10, there being shown for the purpose a sleeve 13 on the coupling section 12 receiving the end of the shaft 10 which is secured by a key 14 and set screws 15. The coupling section 12 is formed with a curved bearing surface 16 centrally therein and with a peripheral flange 17 giving the coupling section 12 a round box-like form. Within the flange 17 is an annular series of projections or teeth 18.

A mating coupling section 19 has suitable means for securing it to the propeller shaft 11, there being shown a sleeve 20 on said coupling section receiving the end of the shaft 11, the connection being permitted by a key 21 and set screws 22. The coupling section 19 terminates in a ball head from which projects an annular series of teeth 23 to mate the teeth 18 and at the extreme end the ball head conforms as at 24 to the seat 16, so that said seat constitutes a thrust bearing for the end of the coupling section 19.

The box-like structure section 12 is provided with a ring closure 25, fitting over the ball head of the coupling section 19 and the opening in the ring having a curved wall 26 to conform to the ball head. The ring 25 is threaded in the flange 17, the latter having internal threads for the purpose, whereby said ring may be adjusted to take up wear. To hold the ring 25 in a given adjustment radial screws 27 are employed extending through the flange 17 and into notches 28 in the back of the ring 25. The screws 27 will enter particular notches 28 according to the adjustment of the ring 25 and will prevent the latter from loosening.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A shaft coupling including a box-like member adapted to be secured to the drive shaft and presenting an annular flange having internal teeth thereon, a mating coupling section adapted to be secured to the driven shaft and presenting a ball head, the first coupling section having a central concave depression to rockably accommodate the end of the ball head, to permit the driven shaft to vary its angular position, said head having an annular series of teeth thereon mating the teeth on the first coupling section, and means to prevent displacement of the coupling sections.

2. A shaft coupling including a box-like element having an annular series of internal teeth, a mating element having an end thrust bearing centrally against the first element and formed with an annular series of teeth mating the teeth on the first element, a ring threaded in the first element and adapted to
5 bear against the second element to retain the same in position, said ring having an annular series of notches in the front face thereof, and screws extending radially through the first element into said notches.

WILLIAM ALFRED FLEEK.

Witnesses:
   LYDIA FELS,
   A. E. GURR.